3,347,233
OCCLUSIVE MEDICATED SHEATH

Joseph Francis Migliarese, Dunellen, N.J., assignor to Colgate-Palmolive Company, New York, N.Y., a corporation of Delaware
No Drawing. Filed Feb. 6, 1964, Ser. No. 343,154
3 Claims. (Cl. 128—260)

This invention has to do with sheaths for application to at least a portion of an animal body to increase percutaneous absorption of a physiologically active material applied to the body. More specifically, the interior surface of the sheaths of this invention contain such a material in contact with the body or proximate to the body.

As is well known in the art, physiologically active agents have been applied to the body as by application of a lotion thereto. It is also well known that such an agent can be enclosed or encased with an impermeable covering such as a medicated occlusive dressing. In such a way, pathological conditions typified by eczema, and non-pathological conditions typified by dry skin, chapped skin, red hands, etc., can be treated. For example, it is known that dermal absorption and effectiveness of various anti-inflamatory steroids is enhanced when steroid-treated skin is wrapped tightly with an occlusive covering composed of a plastic such as a polyvinylidene chloride film (commercially, Saran Wrap). However, such dressings are subject to the same inconvenience attendant bandages, bandage strips and the like. The present invention is directed to sheaths providing a convenient and effective environment in conjunction with suitable physiologically active materials.

It is an object of the present invention, therefore, to provide a sheath for application to at least a portion of an animal body for the treatment of that portion. It is a further object of the invention to provide such a sheath having on the interior surface thereof a suitable medicament, the sheath forming a substantially air-tight bond with the body portion being treated. Another object of the invention is to provide such a sheath for application to at least a portion of an appendage of an animal body. Still another object of the invention is to provide a sheath of the foregoing character useful for treatment of a surface or skin condition of a body. A more particular object of the invention is to provide a sheath serving as a medicated occlusive dressing in the form of an article, such as a glove, to fit over the surface of the body portion subject to treatment. Still another object of the invention is to provide a method for treating non-pathologic skin conditions of an animal by use of such a sheath. Other objects of the invention will be apparent from the following description.

The foregoing objects are realized with a sheath comprising a pliant, non-adherent base impermeable to aqueous fluids, resistant to water and conforming to the shape of the body portion to which it is applied, and a medicament on the interior surface of the base in contact with the body portion, said base forming a substantially air-tight bond with said body portion.

The method contemplated herein for treating a skin condition of an animal comprises: encasing said area with a pliant, non-adherent base impermeable to aqueous fluids, resistant to water and conforming to the shape of said skin area, the interior surface of said base in contact with said area having a medicament thereon.

As indicated, the base to which a medicament is applied or with which it is in proximate contact, is pliant, non-adherent, impermeable to aqueous fluids, resistant to water and conforms to the shape of the body portion to which it is applied. The base should be pliant such that it can be readily adapted to the body portion, and it should not adhere to the body lest it irritate the affected body area. It is also impermeable to aqueous fluids including vapors such as air and liquids of a variety of character. It should also be resistant to water in order that the wearer of the sheath may readily bathe or wash without having the water remove the medicament from the treated area. Suitable materials contemplated for use herein as a base include plastics or polymeric materials derived from ethenoid, vinyl and vinylidene type monomers, heteropolymers thereof, polyamides, polyesters, and the like. Typical illustrations include: polyvinylidene chloride, such as Saran manufactured by the Dow Chemical Company; nylon; Dacron; ethylene and polypropylene. Preferred herein are polyethylene films.

It is also contemplated that the base can comprise an association or combination of layers of a plastic and a non-plastic material. A laminated material suitable for this purpose is exemplified by a vinyl-coated acetate tricot (S–2272) manufactured by the U.S. Rubber Company, Stoughton, Wis. For example, a non-plastic material such as cotton can be associated with or secured to a plastic base, such that the base will form the exterior surface away from the body portion to which the association is applied. In other words, the medicament can be applied to or contained on the cotton and will be so positioned as to be effective for treatment of the body area to which the association is applied, the plastic material serving as the impermeable member of the association.

A wide variety of medicaments can be used herein. These include lotions, salves, creams, powders, etc. The effective agents in such materials can be of a similarly wide range. The agents can be physiologically active, particularly those having dermatological activity. Agents such as antibiotics, aspirin, steroids, antimitotics, sun-screening agents, and the like, can be used. The concentration of such agents are those concentrations conventionally used.

The present invention is more fully described and exemplified in the following examples. It is to be understood, however, that the invention is not to be limited to any specific form of materials or conditions set forth in the examples, but is limited solely by the description in the specification and the appended claims.

EXAMPLE 1

The effect of a closed atmosphere or environment on percutaneous absorption was determined in the following manner. A young woman was treated with 100 milligrams of lanolin containing $C^{14}$ testosterone ($0.1\mu$ C/0.13 microgram). The preparation was applied uniformly over a one-square-inch area on the back of each hand. After maximum incorporation by rubbing (about two minutes), the surfaces were wiped clean of excess lanolin with tissues. The left hand was enclosed in a polyethylene plastic glove and securely fastened at the wrist with tape to provide an air lock. Three hours later, the glove was removed, both hands were washed in warm water and dried. The outermost layers of the skin were progressively removed by application of 1 x 1½ inch pressure tape strips to the treated areas. Six samples were taken from each hand. The activity from the tape was extracted with a toluene-ethyl alcohol mixture and assayed in the liquid scintillation spectrometer. Results of such tests are shown below in Table I.

TABLE I

| Strip No. | Counts/Minute/Skin Stripping | | Ratio, Left Hand Right Hand |
|---|---|---|---|
| | Right Hand (Ungloved) | Left Hand (Gloved) | |
| 1 | 22 | 58 | 2.6 |
| 2 | 7 | 20 | 2.9 |
| 3 | 2 | 21 | 10.5 |
| 4 | 5 | 11 | 2.2 |
| 5 | 5 | 8 | 1.6 |
| 6 | 4 | 5 | 1.2 |

Results given in Table I reveal that the glove-covered skin absorbed substantially more $C^{14}$ testosterone than the uncovered skin.

EXAMPLE 2

An evaluation of plastic gloves and hand lotion for the treatment of chapped skin was made. Four subjects with chapped hands applied a hand lotion to both hands before retiring for the evening. One hand was enclosed in a polyethylene plastic glove. Each subject slept with a glove on the one hand for three evenings. The glove was removed during the day. Each morning the hands of the subjects were examined and the subjects were also asked for subjective evaluation. The hands of four subjects examined revealed that both hands were improved; however, the covered hand in each instance was softer and smoother when compared to the uncovered hand. The white scaling skin characteristic of chapping disappeared from the hand enclosed in the plastic glove. The hands of one subject were examined three days after the test had been terminated and the differences between the hands were still striking. The subjects were also asked for their evaluations. All stated that the lotion was a benefit to their chapped skin. They also stated that the enclosed hand was softer and smoother than the uncovered hand.

The lotion used in this series of experiments was an emulsified oily material in an aqueous carrier.

EXAMPLE 3

Another series of experiments was made to study the influence of a closed environment on percutaneous absorption. In this series of experiments various materials were applied in 100 milligram amounts and spread over a 2.5 x 2.5 square centimeter area of the back of both hands with vigorous rubbing for two minutes. The left hands of the group of individuals were engloved with polyethylene gloves which were secured tightly about the wrists with tape minimizing contact with the atmosphere. Right hands were not covered with gloves. The subjects were allowed to do desk work for three hours. After this time, the surface material was washed off and the hands were dried. The treated areas were sampled by the skin-stripping technique, indicated above in Example 1, using pressure-sensitive cellophane tape. Six consecutive strip-samples were taken from the gloved and ungloved hands. The strip samples were extracted with toluene and alcohol and assayed as indicated above. The results of such tests are expressed in several ways:

(a) as the percentage of total compound recovered from the gloved hand versus the ungloved hand, that is total compound per six strippings from a gloved hand divided by the total compound recovered per six strippings from an ungloved hand $\times 100$;

(b) as the absorption co-efficient $$K = \frac{0.693}{S^{1/2}}$$

expressed as reciprocal strippings; and (c) $S^{1/2}$ refers to the ½ thickness of the skin in terms of its absorption characteristics.

Results of the tests are given in Table II.

TABLE II

| Compound | Percent Gloved Versus Ungloved | Absorption Coefficient, K | | Half-Penetration Value $S^{1/2}$ | |
|---|---|---|---|---|---|
| | | (g)* | (ug)** | (g)* | (ug)** |
| $T^3$-Hexachlorophene and Allantoin in an aqueous alcoholic gel | 122 | 0.19 | 0.139 | 3.5 | 5.0 |
| $T^3$-Hexachlorophene and emulsified oily material in an aqueous carrier | 140 | 0.28 | 0.19 | 2.5 | 3.5 |
| $T^3$-Mineral Oil | 360 | 0.43 | 0.29 | 1.6 | 2.4 |
| $T^3$-Mineral Oil and emulsified oily material in an aqueous carrier | 320 | 0.116 | 0.115 | 6.0 | 6.1 |
| $T^3$-Lantrol a | 780 | 0.27 | 0.23 | 2.6 | 3.0 |
| $T^3$-Lantrol a and emulsified oily material in an aqueous carrier | 420 | 0.28 | 0.19 | 2.5 | 3.5 |
| $C^{14}$-Benzoic Acid in Petrolatum | 240 | | | | |
| $T^3$-Procaine HCl in Lanolin | 720 | 0.19 | 0.18 | 3.6 | 3.9 |
| $C^{14}$-Vitamin "A" in Petrolatum | 460 | 0.27 | 0.23 | 2.6 | 3.0 |
| $C^{14}$-Theophylline, aqueous | 130 | 0.17 | 0.187 | 4.0 | 3.7 |
| $T^3$-Neomycin, aqueous | 140 | | | | |

*(g) = gloved.
**(ug) = ungloved.
a Lantrol is a dewaxed lanolin.

As indicated by the test results, all of the compounds examined were absorbed to a greater degree when the closed environment, a polyethylene glove, was employed. It is to be noted that low K values indicate relatively low absorption; high values indicate accelerated or increased absorption. Conversely, low $S^{1/2}$ values indicate accelerated absorption; high $S^{1/2}$ values indicate slow or reduced absorption. In all instances, the total amount of compound recovered from equal samples of stratum corneum cells was greater from the gloved hand than from the ungloved hand.

EXAMPLE 4

Further studies were made with $T^3$ progesterone incorporated in lanolin and in petrolatum. A known amount of unguentous material was applied to the back of each hand of a number of subjects, and one hand of each was enclosed in a polyethylene glove fastened to the wrist with tape to form an air-tight bond. The period of contact was three hours. Thereafter, strippings of stratum corneum were made with pressure-sensitive tape and the amount of progesterone was determined by means of conventional radiometry. Results are expressed in Table III below as percent of $T^3$ progesterone recovered from the stratum corneum of the closed environment or gloved hand, compared to the recovery from the open or ungloved hand.

TABLE III.—RELATIVE RECOVERY OF T³ PROGESTERONE FROM EQUAL DEPTHS OF STRATUM CORNEUM

| Vehicle | Ratio ug/g | Percent Increase |
|---|---|---|
| Lanolin | 1/1.1 | 110 |
| Do | 1/4.3 | 430 |
| Do | 1/5.2 | 520 |
| Petrolatum | 1/4.1 | 410 |
| Do | 1/2.1 | 210 |
| Do | 1/4.5 | 450 |

Here again, data indicates that a closed atmosphere enhances accumulation of T³ progesterone in the stratum corneum.

EXAMPLE 5

A sample of the hand lotion described in Example 2, was dried in a warm air atmosphere. The dried material was pulverized to a powder. The powder was then introduced into polyethylene gloves, such that it formed a powdered coating on the interior surfaces thereof. The gloves were then worn by the subjects having chapped hands. Moisture developed under the gloves when worn such that the powdered materials were emulsified and solubilized and a lotion was reformed. The benefits to the hands treated with powdered gloves were substantially equivalent to benefits obtained with gloves having lotion-coated interior surfaces. Thus, chapped skin was materially reduced, and the hands were softer and smoother after the gloves were worn.

It will be apparent from the foregoing that pathological skin conditions such as eczema can be treated in accordance with this invention. So also can non-pathological skin conditions such as dry skin, chapped skin, red hands, etc. Other uses include treatment of rheumatoid arthritics by use of a sheath, the interior of which contains aspirin or the like. Another use is that of a depilatory which can be contained on the interior of a suitable stocking. Thus, sheaths contemplated herein can be in the form of a glove, finger, sock, stocking, knee or elbow supporters, trouser, pajama top or suiting such as a skindiving type of suiting. Treatment can be for a short period of time or can be for a number of hours; generally, the sheaths will be used for 6–8 hours and then removed.

While the invention has been described in detail according to preferred compositions and preferred conditions for using the same, it will be obvious to those skilled in the art that changes and modifications can be made, without departing from the spirit or scope of the invention and it is intended in the appended claims to cover such changes and modifications.

I claim:
1. A medicated occlusive sheath in the form of a glove for treatment of a surface of the human hand comprising a pliant, non-adherent, polymeric plastic base material derived from the group consisting of polymers of ethenoid, vinyl and vinylidene monomers, heteropolymers of said monomers, polyamides and polyesters, said plastic base material being impermeable to aqueous fluids, resistant to water and forming a substantially air-tight bond when the hand is enclosed therein; and a coating of a dermatologically active powdered oily material coated on the interior surface of the glove, said powdered material being adapted to be emulsified and solubilized by moisture from the skin to form a lotion.

2. A sheath in accordance with claim 1 wherein said plastic base material is polyethylene.

3. A medicated occlusive sheath for treatment of a surface portion of a human appendage comprising a pliant, non-adherent, polymeric plastic base material derived from the group consisting of polymers of ethenoid, vinyl and vinylidene monomers, heteropolymers of said monomers, polyamides and polyesters, said plastic base material being impermeable to aqueous fluids, resistant to water and forming a substantially air-tight bond when the portion of the appendage is enclosed thereby; and a coating of a dermatologically active powdered oily material coated on the interior surface of the base material, said powdered material being adapted to be emulsified and solubilized by moisture from the skin to form a lotion.

References Cited

UNITED STATES PATENTS

| | | | |
|---|---|---|---|
| 165,955 | 7/1875 | Rowley | 128—163 |
| 441,009 | 11/1890 | Jenkins | 128—163 X |
| 2,074,762 | 3/1937 | Seyfried | 128—172 X |
| 2,438,901 | 4/1948 | Coxe | 128—157 X |
| 2,601,851 | 7/1952 | Jones | 128—260 |
| 2,916,036 | 12/1959 | Sutton | 128—260 |

RICHARD A. GAUDET, *Primary Examiner.*

L. W. TRAPP, *Examiner.*